J. C. FISHER.
Filter.

No. 201,602.   Patented March 26, 1878.

Witnesses.          Inventor.
F. Hunnewill.      James C. Fisher.
W. E. Boardman.   F. Curtis. Atty.

United States Patent Office.

JAMES C. FISHER, OF LAWRENCE, MASSACHUSETTS.

IMPROVEMENT IN FILTERS.

Specification forming part of Letters Patent No. 201,602, dated March 26, 1878; application filed April 9, 1877.

*To all whom it may concern:*

Be it known that I, JAMES C. FISHER, of Lawrence, Essex county, Massachusetts, have invented a certain Improvement in Filters, of which the following is a specification:

This invention has for its object the continuous filtering, without interruption, of large quantities of water for manufacturing purposes, without necessity of removing, changing, or interfering with the filtering medium, or otherwise devoting especial attention to the latter, since, by means of my invention, I am enabled to provide a filtering agent which is automatically cleaned and constantly presents a clean surface to the inflowing water, the sediment or foreign matter in such water being removed without interfering with or suspending the legitimate functions of the filter.

Figure 1:
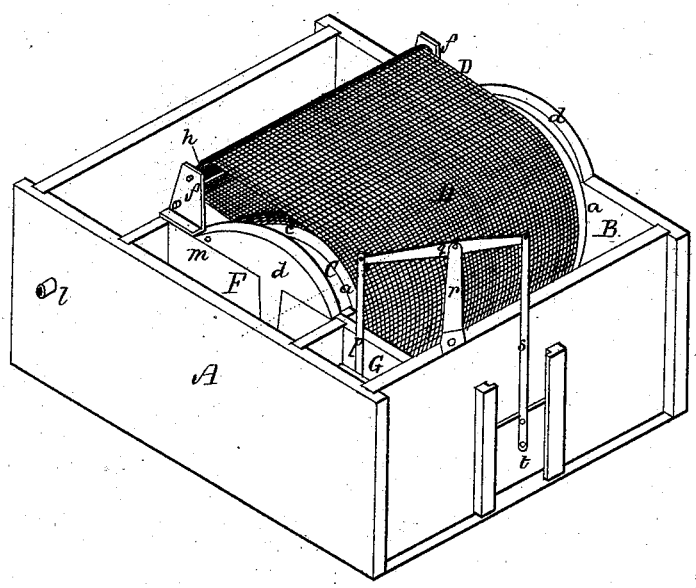
Figure 3:
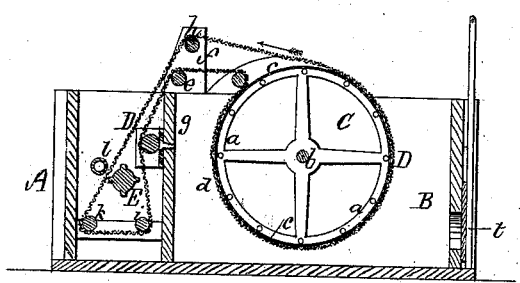
Figure 2:
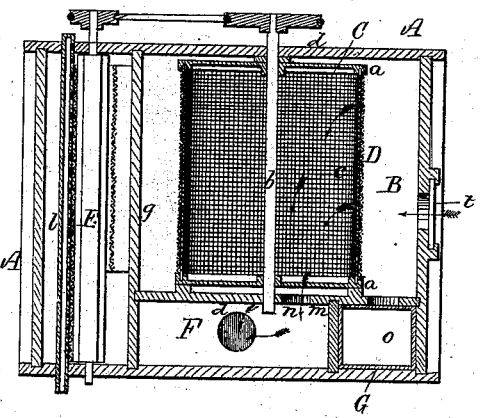

The drawings accompanying this specification represent, in Figure 1, a perspective view of a machine or apparatus embodying my invention, while Fig. 2 is a horizontal section, and Fig. 3 a vertical section, of the same.

In the above-mentioned drawings, A represents a reservoir or tank, which is to be of such form and capacity as shall adapt it to the purposes required of it, and which, in the present instance, is a rectangular upright structure of wood.

The greater portion B of the structure A is used as a water-inlet and receiving-chamber, and is occupied, to a great extent, by a rotary foraminous or reticulated cylinder, C, which is composed, in the present instance, of two or more circular frames or annular heads or rims, $a$ $a$, an axial horizontal shaft, $b$, and a wire-netting covering, $c$, the shaft $b$ being supported at each end in the opposite side walls $d$ $d$ of the said chamber, so as to rotate freely in such bearings, it being desirable that the annular heads $a$ $a$ shall revolve in close proximity to such walls, to prevent the water, after filtration, from returning in any considerable quantity to such chamber.

I do not in any sense restrict myself to details, as herein shown, in the construction of the reticulated cylinder, since its purpose is merely to constitute a carriage or support for the endless filtering apron or screen, to be explained, and, in connection with such screen, a guide to conduct the filtered water from the receiving-chamber B. For instance, in lieu of the wire-netting covering which connects the heads $a$ $a$, longitudinal bars may be employed with success, or a perforated sheet of metal may be used.

To provide a temporary tank or reservoir for reception of the infiltrated water as it leaves the reticulated carriage C, I erect at one side of the inlet-chamber B a tank, F, and create in the wall $m$, which separates the two, an orifice, $n$, so arranged in relation to the adjacent end or rim of the said carriage C that water passing through the endless screen D shall flow through such orifice into the said temporary reservoir F.

At some convenient point in the immediate proximity of the chamber B—say, at the front corner next the tank F—I erect a well, as shown at G, which has open communication with said chamber B, and is provided with a float, $o$, the stem $p$ of which is pivoted to one end of a horizontal lever, $q$, that in turn is pivoted to a post, $r$, erected upon the front wall of the said chamber B, the opposite end of the said lever being pivoted to the stem $s$ of a suitable gate, $t$, which governs the passage of water to the chamber. The float $o$ is designed to prevent overflow of the machine.

The filtering agent employed in the present instance is an endless apron, D, of coarse flannel or other loosely-woven cloth or textile fabric, capable of arresting sediment or foreign matter without offering material obstruction to the passage of water, such apron inclosing, for the greater part, the circumference of the rotary carriage C, and being of considerable greater length than is requisite to envelop the latter, in order that it may travel away from such carriage, for the purpose of being cleaned of the dirt or foreign matter adhering to it.

In the accompanying drawings it will be seen that the apron or traveling screen C travels partially about several idle-rolls, one being shown at $e$, revolving in uprights $f f$, erected upon the top of the rear wall $g$ of the chamber B; a second being shown at $h$, as disposed above the first, and revolving in the same uprights $f f$; a third at $i$, as disposed in rear of the lower part of said wall $g$; and a fourth and companion to the latter at $k$, and placed alongside of it, with a space intervening between them.

The apron D travels from the top of the reticulated cylinder or support C to and over the roll $h$; thence downward beneath the twin rolls $i$ and $k$, and upward to and over the roll $e$; thence downward and beneath and about the said cylinder C, thus completing its circuit.

Disposed somewhat above and between the rolls $i\ k$ will be seen a rotary beater, E, composed, in this case, of a fluted horizontal roller arranged parallel to the said rolls $i\ k$, and revolving in standards suitably disposed. This beater is intended to revolve against and beat or agitate the endless apron D as it passes it, either in descending or ascending, or both, in order to loosen or dislodge the sediment or foreign matters deposited upon the apron from the water passing through it; and to facilitate the loosening and dislodging of such sediment, a foraminous spray-pipe, $l$, may be employed, connected with a suitable supply of water under pressure, and arranged, for instance, in rear of and slightly above the beater, as shown in Fig. 3 of the drawings, the jets of water issuing from such pipe being directed upon the traveling apron.

It is essential to the economical operation of my machine that the water, after filtration, shall be pumped or otherwise conducted or suffered to flow into a reserve tank or reservoir, and this reservoir provided with an overflow outlet, which shall discharge into or return to the well G. By this means waste of water is avoided, and the apparatus is in motion only when water is used, since the overflow from the reserve-reservoir returns to the well, raises its float, and closes the gate $t$, and shuts off flow of water to the chamber B.

It will be manifest that as the apron or endless screen D is, while water is being used, continually in motion, and as it passes the beater E is cleaned of any foreign matter adhering to it, it presents at all times to the inflowing water a clean filtering medium.

Having thus explained the nature and purpose of my invention, and illustrated and described one manner in which the same is or may be put into practical operation, I claim as my invention, and desire to secure by Letters Patent, the following:

1. In combination with the filtering-chamber and the filtering-apron and its supporting carriage or cylinder contained in said chamber, the well, and the float operated by water supplied to said well to govern the admission of water to the filtering-chamber, substantially as described.

2. In combination with the traveling filtering-apron, the cleansing apparatus arranged in a chamber separate from the filtering-chamber, and consisting of a rotating beater and a sprayer which discharges water directly upon the apron at a point in advance of where the beater operates on said apron, as shown and set forth.

3. In combination with the cleansing-chamber and the rotating beater and sprayer arranged in said chamber, each to operate directly on the apron, as described, the traveling apron and its power-driven supporting-cylinder, mounted in the filtering-chamber and imparting movement to the apron, as set forth.

JAMES C. FISHER.

Witnesses:
H. G. CORDLEY,
H. F. LOCKE.